Figure 1:
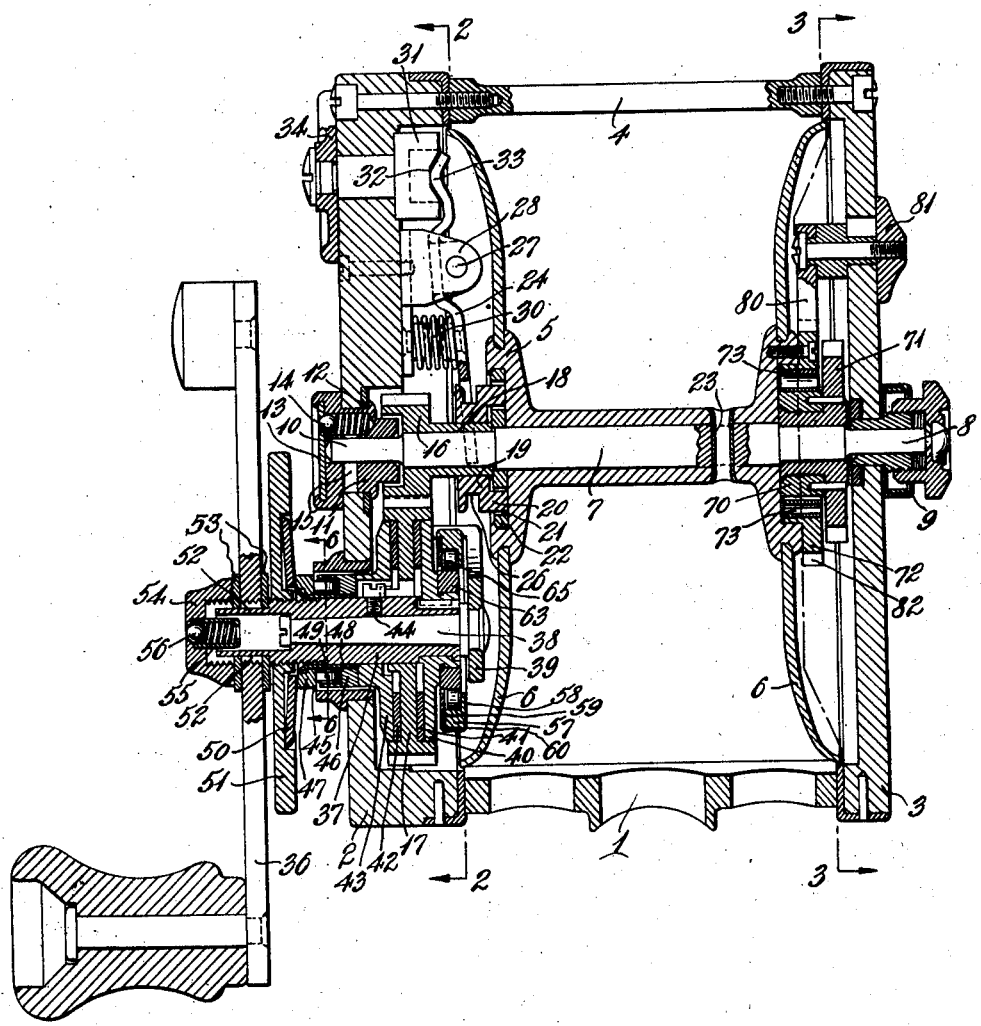

Sept. 22, 1925. 1,554,786
F. M. CASE
FISHING REEL
Filed March 25, 1922 3 Sheets-Sheet 1

Inventor.
Francis M. Case
By Brockett & Hyde
Attys.

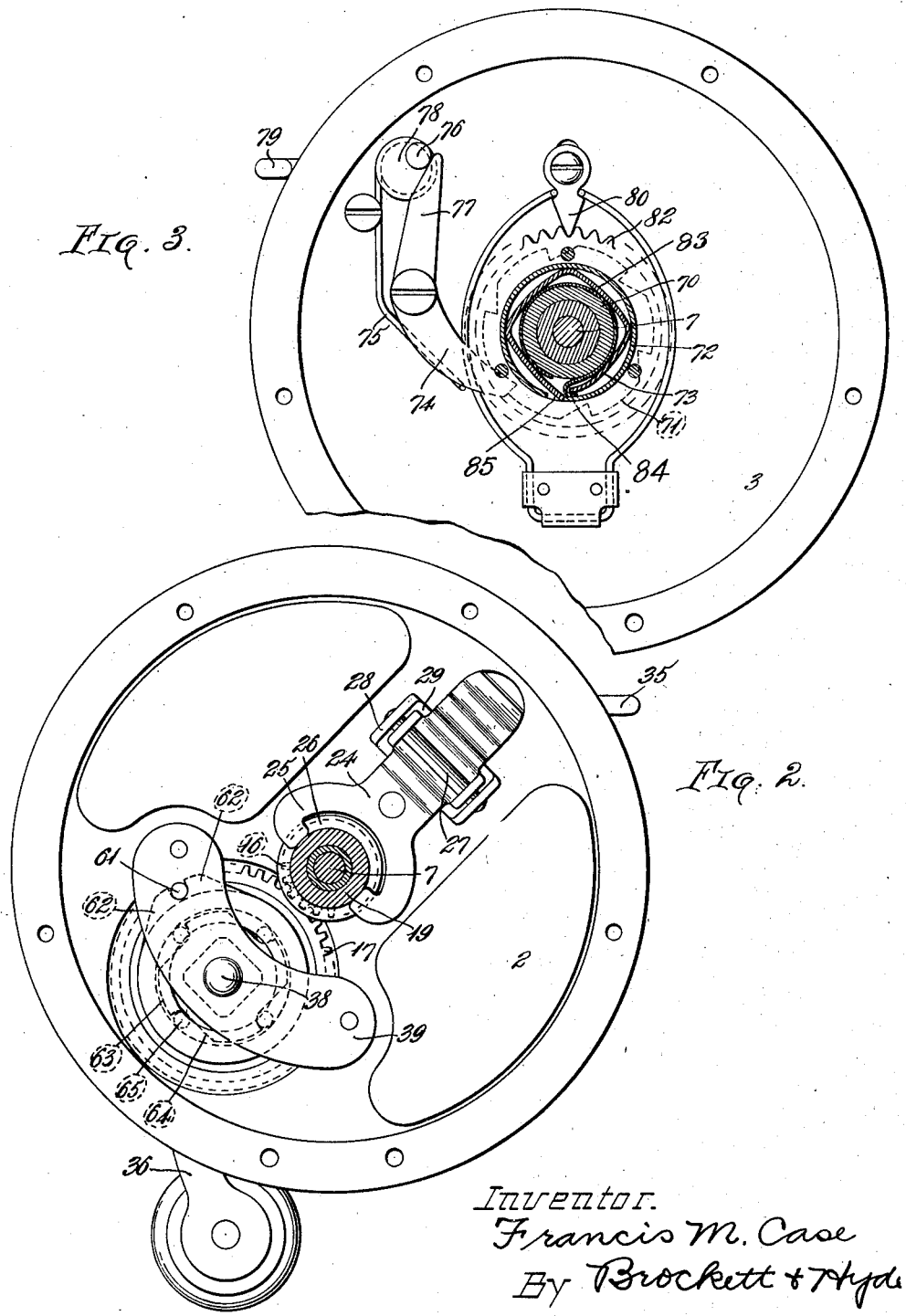

Sept. 22, 1925.
F. M. CASE
FISHING REEL
Filed March 25, 1922
1,554,786
3 Sheets-Sheet 3
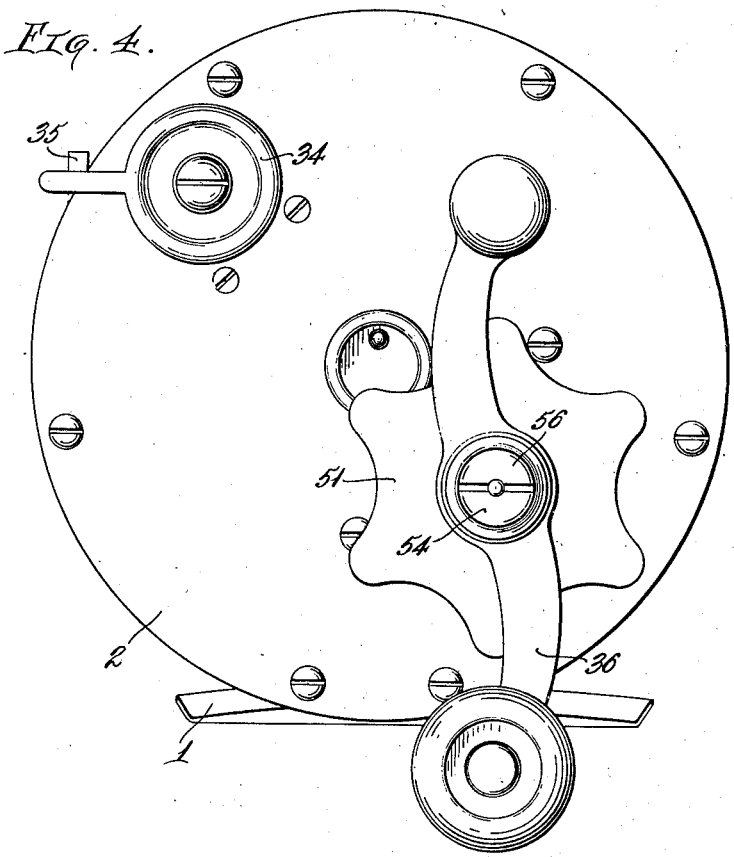
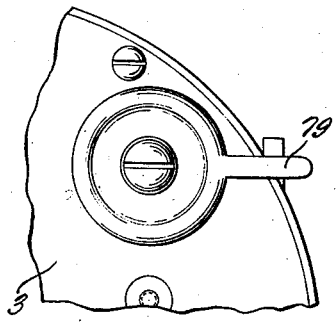
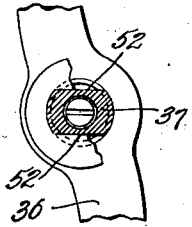
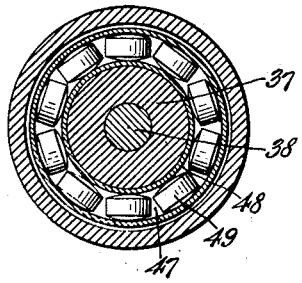
Inventor.
Francis M. Case
By Brockett & Hyde
Attys.

Patented Sept. 22, 1925.

1,554,786

UNITED STATES PATENT OFFICE.

FRANCIS M. CASE, OF CLEVELAND HEIGHTS, OHIO, ASSIGNOR TO THE ENTERPRISE MANUFACTURING COMPANY, OF AKRON, OHIO, A CORPORATION OF OHIO.

FISHING REEL.

Application filed March 25, 1922. Serial No. 546,637.

*To all whom it may concern:*

Be it known that I, FRANCIS M. CASE, a citizen of the United States, residing at Cleveland Heights, in the county of Cuyahoga and State of Ohio, have invented certain new and useful Improvements in Fishing Reels, of which the following is a specification.

This invention relates to fishing reels, and more particularly to surf casting salt water reels.

The object of the invention is to provide an improved fishing reel embodying simple, efficient and easily operated mechanism for controlling rotation of the spool, said mechanism enabling the reel to be operated with a freely rotating spool, rotation of which by a pull on the line or by operation of the winding handle may be readily retarded with frictional resistance, and which reel is also provided with improved means for positively preventing rotation of the winding handle in the unwinding direction.

A further object of the invention is to improve the general construction of the reel, including the antifriction bearings, lubricating devices, operating handle, supporting devices, the friction brake, clutch actuating mechanism, friction drive tension means, and friction drive tension regulating mechanism.

Further objects of the invention are in part obvious and in part will appear more in detail hereinafter.

In the drawings, Fig. 1 is a longitudinal section of a reel embodying the invention; Fig. 2 is a section on the line 2—2, Fig. 1; Fig. 3 is a section on the line 3—3, Fig. 1; Fig. 4 is an end elevation from the left in Fig. 1; Fig. 5 is a detail end elevation from the right in Fig. 1; and Figs. 6 and 7 are detail views, on a larger scale, on the lines 6—6 and 7—7, Fig. 1, respectively.

The fishing reel illustrated in the drawings comprises the usual frame including a foot plate 1 adapted for attachment to the fishing rod, end caps or heads 2, 3, connected by pillars or posts 4, and a rotating line receiving spool 5 having end heads 6 and a shaft 7 suitably journalled in the frame, as will appear.

At one end the spool shaft has a reduced portion 8 journalled in a suitable bearing indicated generally at 9 which, as illustrated, is of the form shown in my prior application for fishing reels, filed November 19, 1921, Serial No. 516,407. At its opposite end shaft 7 is provided with a reduced portion 10 entering a bearing member 11 permanently secured by beading at 12 to the end cap 3 and having an end bearing plate 13 of hardened material in which is an opening normally closed by a yielding ball 14, said opening leading to channels 15 for supplying lubricant to the rotating shaft. On another portion of the shaft rotates loosely a driving pinion 16 actuated by a gear 17, said pinion having a squared hub or extension 18 on which slides a pin clutch member 19, the pins 20 of which are adapted to enter openings 21 in a clutch member 22 fastened to the spool, said spool being fastened to the shaft 7 by the tube 23, which also serves as a line anchoring device. By sliding the clutch along the pinion hub driving connections may be made or broken between the driving pinion and the spool, whereby the spool may be either driven by the pinion or allowed to rotate in its bearings independently of the pinion.

The improved clutch operating mechanism shown comprises a clutch actuating lever 24 having a yoke portion 25, the arms of which enter an annular groove 26 in the clutch member. Said lever is mounted to turn upon a pivot pin 27 supported by ears 28 on a plate 29 attached to the end head 3 and is yieldingly moved toward clutch closing or driving position by a compression spring 30, but may be moved in the opposite direction, to clutch release or free spool position, by rotation of a cam member 31, the inner cam portion of which has a transverse cam recess 32 to receive a bent portion 33 of the lever arm. This rotatable cam extends to the outside of the reel head where it is provided with a disc member 34 having an operating finger portion 35 extending over the outer peripheral surface of the reel head and adapted to be moved back and forth by the operator's finger.

The gear 17 which actuates driving pinion 16 is frictionally connected for rotation by the operating handle 36 which is fastened to a hollow sleeve 37 rotatable on a stub shaft 38 carried by a bridge plate 39 immovably attached to the reel head, as shown in Fig. 2. Said sleeve has secured to rotate therewith a friction plate 40 between which and the gear 17 is a layer of friction material 41, such as leather or the like. Gear 17 also has slight longitudinal motion on sleeve 37 and is rotatable thereon and on its opposite face engages friction material 42 lying between it and a second friction plate 43, longitudinally movable upon the sleeve but pinned to rotate therewith by the screw 44. The frictional resistance through this friction drive may be varied by more or less forcing the two friction plates 40, 43 toward each other, for which purpose suitable means is provided for adjusting plate 43. The means shown comprises a roller bearing unit, marked generally 45, and which includes inner and outer race ways 46, 47 held together by the sleeve 48 and between which are rollers 49. Said unit at its inner end abuts an extension of the plate 43 and at its outer end abuts a dished washer 50 adapted to be sprung to straightened position by screwing up the adjusting plate 51 against it, said plate being threaded upon the sleeve 37.

With the foregoing arrangement plate 51 may be screwed up to produce any desired pressure or resistance in the friction drive. If the operating handle is then turned in the winding direction the line will come in until the pull upon the line either by a fish or a snag is greater than the resistance in the friction drive. Likewise if the driving handle is held stationary the line can be pulled out so long as the pull will overcome the frictional resistance in the drive.

In the present reel an improved arrangement has been provided for attaching the operating handle to the sleeve 37. In prior constructions for this purpose the outer end portion of the sleeve has been provided with a reduced threaded portion upon which the handle is threaded against the shoulder formed by such reduction. The consequent weakening of the sleeve according to this prior practice has been avoided in the present reel by leaving the sleeve of full diameter throughout its entire length and flattening it off on two sides, as at 52, to receive two lock washers 53, one lying on each side of the handle, and both of which have central holes of special form to fit the flattened portion of the sleeve so that the inner washer can be pushed up against the shoulder at the end of the flats. The handle is screwed upon the shaft between the two washers and is held in place by a cap nut 54 having a central opening in which is a small sleeve 55 containing a yielding ball 56 normally closing a central opening through which lubricant may be introduced to the bearing for sleeve 37.

The reel is also provided with means for preventing backward rotation of the winding handle, whereby rotation of the spool is always retarded by the friction imposed on gear 17 and the reel cannot be freely unwound when the clutch is closed, even if the operator's hand is removed from the operating handle. The arrangement for this purpose comprises a ring 57 having a flange 58 on one side and a flange formed by a ring 59 on the opposite side, said ring being held permanently in place by beading over the metal, as shown at 60. Said ring is prevented from rotating by a pin 61 carried by the bridge member 39 and entering a recess between two ears 62 on said ring. Within said ring is a cam member 63, having cam recess 64 each of which receives a small roller 65.

This arrangement is in fact a roller clutch effective in one direction only. The direction of inclination of the inclined bottoms of the recesses 64 is such that when the driving handle 36 is turned in the winding direction the roller clutch slips loosely and has no effect whatever. However, when any attempt is made to rotate the handle 36 in the backward direction, either by a pull of the line on the spool or by the operator's hand, one, at least of the rollers 65 becomes effective and wedges in place in the narrow part of its recess between members 63 and 57. Ring 57 practically floats upon the rollers so that clutching engagement of one roller necessarily produces clutching engagement of one or two other rollers so that the clutch is always immediately effective in resisting backward rotation of the handle.

At the opposite end of the reel the spool is provided with a frictional retarding brake adapted to be thrown into and out of operation as desired. This brake comprises an inner cylindrical braking member 70 pinned to the hub of a ratchet 71, said two members 70 and 71 being rotatable upon the spool shaft. Surrounding member 70 is a ring 72 secured to rotate with the spool. Between members 70 and 72 is a resilient bent spring strip 73, said strip being bent into practically square form, as shown in Fig. 3, with the ends not quite meeting, it being understood that the normally straight portions of this bent square strip are bowed outwardly and strained between members 70, 72. As a result said spring imposes friction upon both of said members. By holding the ratchet 71 against rotation the spool and member 72 cannot rotate except by overcoming the frictional effect of spring 73. Ratchet 71 is therefore provided with means for holding it against rotation, such as the pawl 74, yieldingly held against said ratchet by a spring 75 and capable of being thrown out of operation by an eccentric pin 76 engaging an arm 77 of the pawl, said eccentric being actuated by turning its supporting shaft 78 which is provided with an operating finger 79 of practically the same form as the operating finger 35 for the cam 31.

The continued use of this retarding brake may in time wear the spring 73 where it slips or slides on members 70, 72. I therefore preferably provide means for preventing slip between spring 73 and member 72 and also provide a readily removable lining for said spring. This lining, marked 83, is a metal band surrounding member 70 and lying between it and spring 73. One end of the band is hooked at 84 around one end of spring 73. Member 72 is also provided with a small recess 85 to receive either the free end of spring 73, as shown, or the hooked end 84 of band 83. In either case, when the member 70 is held stationary by pawl 74 the rotation of the spool when the line is unwound positively carries around with it both the spring 73 and band 83 with a tendency to wrap the latter more tightly around member 70 and increase the braking effect. All the wear is on readily removable band 83. Said band and the spring may be made of phosphor bronze or any other suitable material and either or both of members 70, 72 may be made of metal fibre or other suitable material.

80 represents the usual click which is of common form thrown into and out of operation by the slidable button 81 and which click engages ratchet teeth 82 in member 72.

What I claim is:

1. In a fishing reel, a frame, a rotatable spool therein, and braking means for said spool, comprising two relatively rotatable frictionally connected members centered about the spool shaft, means for locking one of said members to the frame and the other to the spool to produce a braking effect, and means for releasing one of said locking means to permit free rotation of the spool.

2. In a fishing reel, a frame, a rotatable spool therein, and braking means for said spool, comprising two relatively rotatable frictionally connected members centered about the spool shaft, one of said members being locked to rotate with the spool, and means on the frame for holding or releasing the other member to control the braking effect.

3. In a fishing reel, a frame, a rotatable spool therein, and braking means for said spool, comprising two members one surrounding the other, a bent spring between them arranged to exert frictional pressure along radial lines, and means for connecting said members to the frame and spool respectively to produce a braking effect.

4. In a fishing reel, a frame, a rotatable spool therein, and braking means for said spool, comprising two members one surrounding the other, a bent spring between them arranged to exert frictional pressure along radial lines, means for connecting said members to the frame and spool respectively to produce a braking effect, and means for releasing one of said members for free spool rotation.

5. In a fishing reel, a frame, a rotatable spool therein, and a braking means for said spool, comprising two relatively rotatable frictionally connected members centered about the spool shaft, means for locking one of said members to the frame and the other to the spool to produce a braking effect, and means for releasing that one of said locking means which locks the rotatable member to the frame so as to permit free rotation of the spool.

6. In a fishing reel, a frame, a rotatable spool therein, and a braking means for said spool, comprising two members one surrounding the other, a bent spring between them arranged to exert frictional pressure along radial lines, means for connecting said members to the frame and spool respectively to produce a braking effect, and means for releasing that one of said members which is connected to the frame so as to permit free spool rotation.

In testimony whereof I hereby affix my signature.

FRANCIS M. CASE.